(12) United States Patent
Defendini et al.

(10) Patent No.: US 6,305,647 B1
(45) Date of Patent: Oct. 23, 2001

(54) METHOD AND APPARATUS FOR STEERING THE ATTITUDE OF A SATELLITE

(75) Inventors: Ange Defendini, Montjoire; Kristen Lagadec, Toulouse, both of (FR)

(73) Assignee: Matra Marconi Space France, Paris (FR)

( * ) Notice: Subject to any disclaimer, the term of this patent is extended or adjusted under 35 U.S.C. 154(b) by 0 days.

(21) Appl. No.: 09/443,366

(22) Filed: Nov. 19, 1999

(30) Foreign Application Priority Data

Nov. 19, 1998 (FR) .................................. 98 14548

(51) Int. Cl.$^7$ .............................. B64G 1/28; B64C 17/06

(52) U.S. Cl. ........................................... 244/165; 244/79

(58) Field of Search ....................... 244/165, 79

(56) References Cited

U.S. PATENT DOCUMENTS

| | | | |
|---|---|---|---|
| 3,741,500 | * 6/1973 | Liden | 244/1 |
| 4,375,878 | * 3/1983 | Harvey et al. | 244/158 |
| 4,573,651 | 3/1986 | Stanton | 244/165 |
| 5,441,222 | 8/1995 | Rosen | 244/165 |
| 5,681,012 | * 10/1997 | Rosmann et al. | 244/165 |
| 5,692,707 | 12/1997 | Smay | 244/165 |
| 6,039,290 | * 3/2000 | Wie et al. | 244/165 |
| 6,131,056 | * 10/2000 | Bailey et al. | 244/165 |

FOREIGN PATENT DOCUMENTS

| | | | |
|---|---|---|---|
| WO 094010036 A1 | * 5/1994 | (WO) | 244/165 |
| WO 094014653 A1 | * 7/1994 | (WO) | 244/165 |

OTHER PUBLICATIONS

H.S. Oh and S.R. Vadali: "Feedback Control and Steering Laws for Spacecraft Using single Gimbal Conrol Moment Gyros" Journal of the Astronautical Sciences, vol. 39, No. 2, Apr. '91 ('91–04)–Jun. '91 ('91–06) pp. 183–203, XP002112652—U.S.A.–Paragraphs "Abstract", "Introduction", "Feedback Control Laws", "Steering Laws", "Simulations".

S.R. Vadali et al.: "Suboptimal Command Generation for Control Moment Gyoscopes and Feedback Control of Spacecraft" Journal of Guidance, Control and Dynamics, vol. 18, No. 6, Nov. '95 ('95–11)–Dec. '95 ('95–12) pp. 1350–1354, xp000558647, Washington, D.C., U.S. Whole document.

Haruhisa Kurokawa: "Constrained Steering Law of Pyramid–Type Control Moment Gyros and Ground Tests"— Journal of Guidance Control and Dynamics, vol. 20, No. 3, Mai 1997 (1997–05)–Jun. 1997 (1997–06), pp. 445–449, XP002112653—Washington, D.C. U.S. *Whole document*.

(List continued on next page.)

Primary Examiner—Charles T. Jordan
Assistant Examiner—Christian M. Best
(74) Attorney, Agent, or Firm—Larson & Taylor.PLC

(57) ABSTRACT

A method is disclosed for controlling the attitude of a satellite by controlling the speed of the gimbals of CMGs in a cluster of CMGs, the CMG having respective wheels mounted on gimbals that are mounted on a satellite platform to rotate about different orientation axes. From starting conditions and end conditions relating to attitude and angular speed and time, a cluster configuration is determined that is remote from any singular configuration such that exchanging angular momentum between the cluster of CMGs and the satellite during a given length of time will give rise to the desired attitude maneuver. The orientation of each gimbal is changed in simultaneous and independent manner into its reference orientation by using an angular position reference, applied in an open loop in the local servo-control of the angular positions of the gimbals.

10 Claims, 2 Drawing Sheets

OTHER PUBLICATIONS

Jun'ichiro Kawaguchi et al.: "Closed Loop Momentum Transfer Maneuers Using Multiwheels" —Journal of Guidance, Control and Dynamics, vol. 18, No. 4, Jul. 1995 (1995–07)–Aug. 1995 (1995–08), pp. 867–874, XP000558528—Washington, D.C.—U.S.—Paragraphs "Introduction", "Equations of Motion of the Spacecraft with Multiwheels", "Closed Loop Control Law During Momentum Transfer Maneuver", "Singular States Analyses"; Figs. 1–5.

Joseph A. Paradiso: "Global Steering of Single Gimballed Control Moment Gyroscopes Using a Directional Search"— Journal of Guidance, Control and Dynamics, vol. 15, No. 5, Sep. 1992 (1992–09), pp. 126–1244, XP002112654, Washington, D.C., U.S.—Paragraphs "Introduction", CMG Kinematic Steering", Global CMG Steering Using a Guided Search".

* cited by examiner

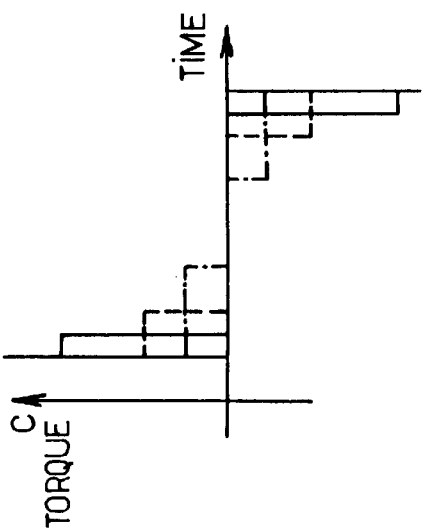
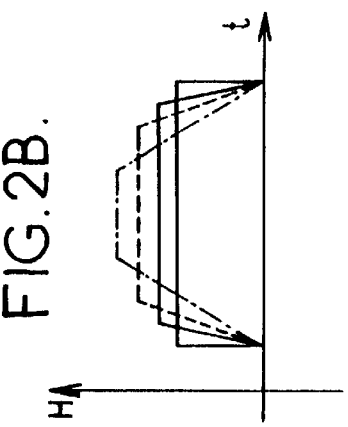
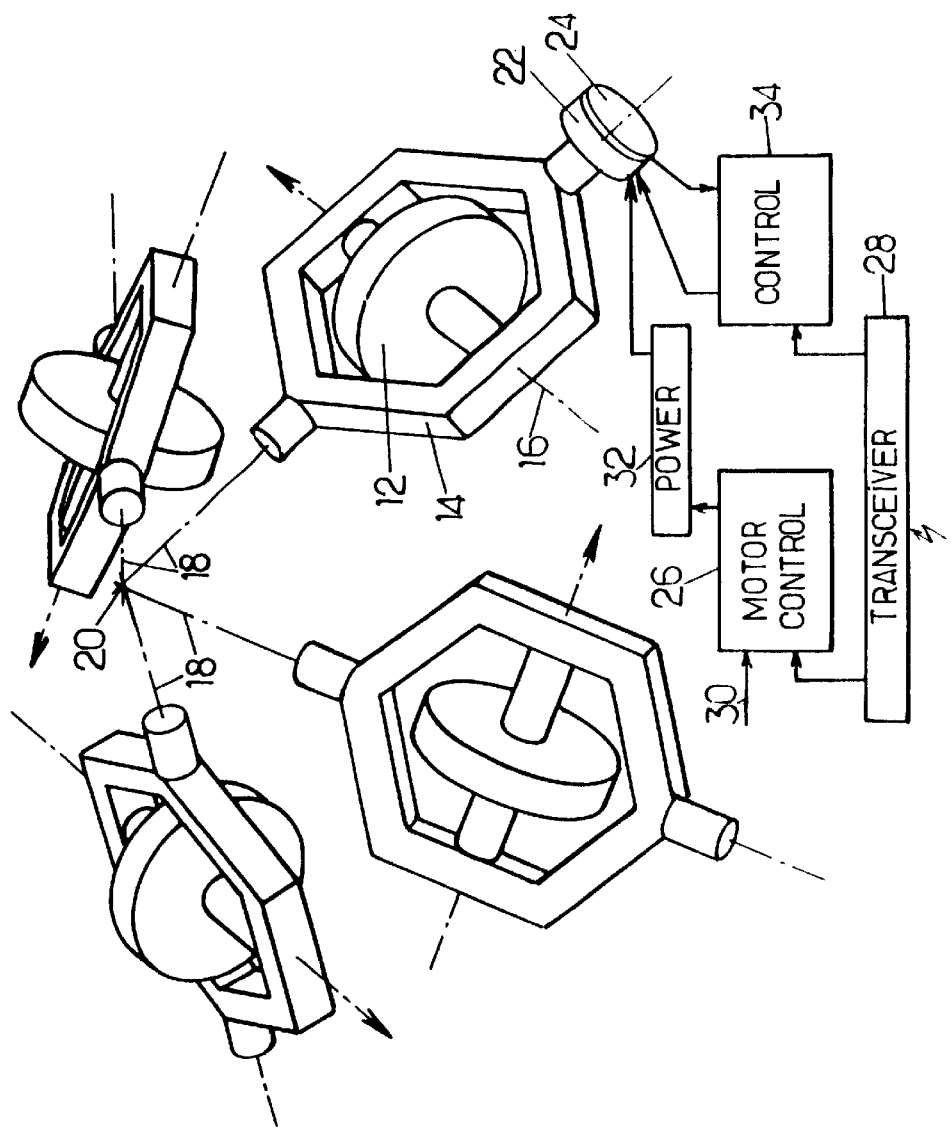

METHOD AND APPARATUS FOR STEERING THE ATTITUDE OF A SATELLITE

The present invention relates to methods and apparatuses for steering the attitude of a satellite by controlling the orientation the axis of rotation of the wheels of a cluster or array of control moment gyros (CMGs) on board the satellite.

Control moment gyros differ from reaction wheels of the kind commonly used for controlling the attitude of a satellite by exchange of angular momentum, in that they are mounted on respective gimbals that can each be steered by at least one motor about at least one axis orthogonal to the axis of rotation of the gyro wheel. In most cases the wheels are driven at a speed that is constant or that varies little once they are in action.

A cluster of CHGs must have at least three CMGs to make it possible to reorient the three-dimensional frame of reference associated with the satellite into any attitude, and it must have at least two CMGs for steering about two axes. In practice, at least four CMGs are used in a cluster so as to provide redundancy.

A cluster of CMGs constitutes an intertial actuator which can be controlled to apply torque imparting a specified angular speed profile to the satellite, where the specification is generally download from a ground station. The torque is generated by causing the gimbal axis to rotate in such a manner as to cause the CMG wheel to precess. For the wheel of order i, the torque $C_i$ due to the gyroscopic effect is given by:

$$C_i = H_i \sigma_{i\,dot}$$

where $H_i$ is the moment of inertia of the wheel; and $\sigma_{i\,dot}$ is the speed of rotation.

$$C_i = H_i \sigma_{i\,dot}$$

where $H_i$ is the moment of inertia of the wheel; and $\sigma_{i\,dot}$ is the speed of rotation.

A satellite generally has an attitude control system that receives input signals from sensors enabling its angular position to be determined in an inertial frame of reference. This system which generally has a relatively long time constant enables the satellite to be maintained in a reference attitude by controlling the motors of the reaction wheels, or the motors of the gimbals, when the satellite is fitted with CMGs.

In the case under consideration herein, where attitude is controlled by means of a cluster of CMGs, the control system begins by determining the torque that needs to be applied and must deduce therefrom the speed that should be applied to the gimbals of the CMGS. The angular positions of the gimbals vary over time. The ability to provide a total torque C is consequently not steady and not linear. It can be written in matrix form as follows:

$$C = A(\sigma) \cdot \sigma_{dot} \quad (1)$$

where A is the Jacobian matrix, $a_{ij} = \partial H_i / \partial \sigma_j$, where i=1 to 3 and j=1 to 4 (or more generally from one to the number of CMGs).

Given the torque C to be delivered, a conventional guidance method consists in inverting equation (1) so as to obtain the reference speeds $\sigma_{c\,dot}$ to be given to the gimbals.

Certain missions provide for the attitude of the satellite to be changed to a large extent over a short period of time. CMGs are particularly suitable to such "agile" missions. At present, essentially two methods are used for determining the speed profile to be imposed on the gimbals of the CMGs.

In a first method, guidance can be said to be "local", and on each request for torque, the angular speed required for each gimbal is calculated using equation (2), which amounts to pseudo-inversion of the Jacobian. The constraint imposed to accommodate the redundancy is to seek movement requiring minimum energy.

$$\sigma_{c\,dot} = [A'(A.A')^{-1}]C. \quad (2)$$

Experience shows that that approach often leads to abandoning a CMG whose reorientation towards the required direction requires too much speed of all of the gimbals, with the result that in the end the cluster has one wheel that is "sleeping" while all the others are grouped together in an opposite direction. The cluster is thus in a singular configuration: angular momentum is at a maximum in said opposite direction and it is impossible to obtain torque in said direction.

There are algorithms for local avoidance of singularities due to the gimbals being set into motion, for example requiring the total resulting torque to be zero. However, those algorithms are not very effective since the approach of a singularity is detected late due to a lack of predictions concerning the torque profile to be followed. This means that the capacity of the cluster needs to be over dimensioned so as to be able to avoid most singularities.

Another approach which can be referred to as continuous overall guidance requires calculation to be performed prior to beginning a maneuver to change the attitude of the satellite in order to determine the best trajectory for reconfiguring the cluster $\sigma(t)$ throughout the maneuver, so as to avoid going close to any singular configuration. That calculation is very time consuming. It must be performed on the ground and then transferred.

The present invention seeks to provide a method making it possible when steering attitude by means of CMGs, to avoid the problem of singularities while putting a limit on the associated calculation load. The invention thus makes it possible to take full advantage of the capacity of the cluster whenever it is required to tilt the attitude of the satellite.

For this purpose, the invention makes use specifically of the fact that the torque capacity of a CMG is limited only by the maximum speed of rotation of the gimbal drive motor. The invention also makes use of the observation that it is possible to pass transiently through a singular configuration, providing this takes place while the cluster of CMGs is being reconfigured into a predetermined reference configuration and providing the gimbals at that time are moving with high angular speed.

Consequently, the invention provides a method of steering the attitude of a satellite by controlling one of the CMGs in a cluster (generally of at least four CMGs), having respective wheels mounted on gimbals that are mounted to rotate on a platform of the satellite about different orientation axes, which method comprises the steps of:

on the basis of starting conditions and end conditions relating to attitude and angular speed and time, determining a cluster configuration that is remote from any singular configuration such that exchanging angular momentum between the cluster of CMGs and the satellite during a given length of time will give rise to the desired attitude maneuver; and bringing the orientation of each gimbal in simultaneous and independent manner into its reference orientation by using an angular position reference applied in an open loop in the local servo-control of the angular positions of the gimbals.

It is advantageous to cause the gimbal drive motors to accelerate in the minimum length of time compatible with the mechanical strength of the CMGS, and then to continue operating at a steady speed, and then to return to zero speed.

The invention thus makes it possible to reduce the time required for tilting purposes by shortening the stages of angular acceleration and deceleration at the beginning and at the end of a maneuver. In practice, acceleration can be quasi-instantaneous compared with the response time of the attitude servo-control system. The internal angular momentum is reoriented into the appropriate direction to obtain the desired speed and attitude profile for the satellite before said system can act.

The existence of redundancy makes it possible to have a degree of freedom in selecting the configuration of the tilting cluster. Amongst possible criteria for making a selection, it is often advantageous to select one of the following:

maximizing the square root of the determinant of (AA'), which amounts to maximizing margin relative to singularities;

minimizing the infinite norm of the vector s, where the vector s is the vector of the norms of the rows of A' $(A.A)^{-1}$, which corresponds to maximum steerability in three axis torque for the end configuration;

infinite norm of minimum σ, which corresponds to minimizing cluster reconfiguration time; and norm 2 of minimum σ (minimum-energy reconfiguration).

The method also makes it possible to take account of a constraint in the orientation angle domain for each gimbal by limiting that domain to a determined range, e.g. 360°, thus making it possible to avoid making connections via slip rings and brushes, and to use cables for conveying power and signals.

Since the end configuration of the gimbals is remote from any singularity, the attitude control system can compensate for residual errors in the attitude and the speed of the satellite by means of the above-mentioned inversion of the Jacobian matrix.

After a few maneuvers, the excursions in the angular positions of the gimbals about the reference configuration remain small: desaturation during standby periods make it possible to return the cluster to its canonical configuration.

The invention also provides apparatus for steering attitude and comprising:

a cluster of at least three CMGs for three-axis steering and of at least two CMGs for two-axis steering, the CMGs having respective wheels mounted on gimbals that are mounted on a satellite platform to rotate about different orientation axes; and means for taking starting and end conditions in terms of attitude, angular velocity, and time, to determine a configuration for the cluster that is remote from any singular configuration, such that the exchange of angular momentum between the cluster of CMGs and the satellite for a set length of time will cause the desired attitude maneuver to take place, and to control the gimbal motors in such a manner as to bring the orientation of each gimbal in simultaneous and independent manner into its reference orientation by means of an angular position reference applied in an open loop in the local angular position servo-control of the gimbals.

In such apparatus it is possible to limit the domain of angular excursion of the axis of a one-axis CMG (e.g. to ±½ turn). In such apparatus, it is possible to use a small CMG that occupies little space, and that is capable of supplying sufficient torque to enable intermediate-class satellites to maneuver quickly, the wheel of the CMG comprising two disks interconnected by a shaft of diameter that is much smaller than that of the disks and whose gimbal includes means in which the shaft rotates.

The above characteristics and others will appear more clearly on reading the following description of a particular embodiment of the invention, given by way of non-limiting example. The description refers to the accompanying drawings, in which:

FIG. 1 is a perspective diagram showing one possible disposition of four single-axis CMGs in a cluster, in their canonical position;

FIGS. 2A and 2B show how the torque applied by a CMG varies over time and how the angular momentum H exchanged with the platform varies over time, for various acceleration profiles.

Figure 3:
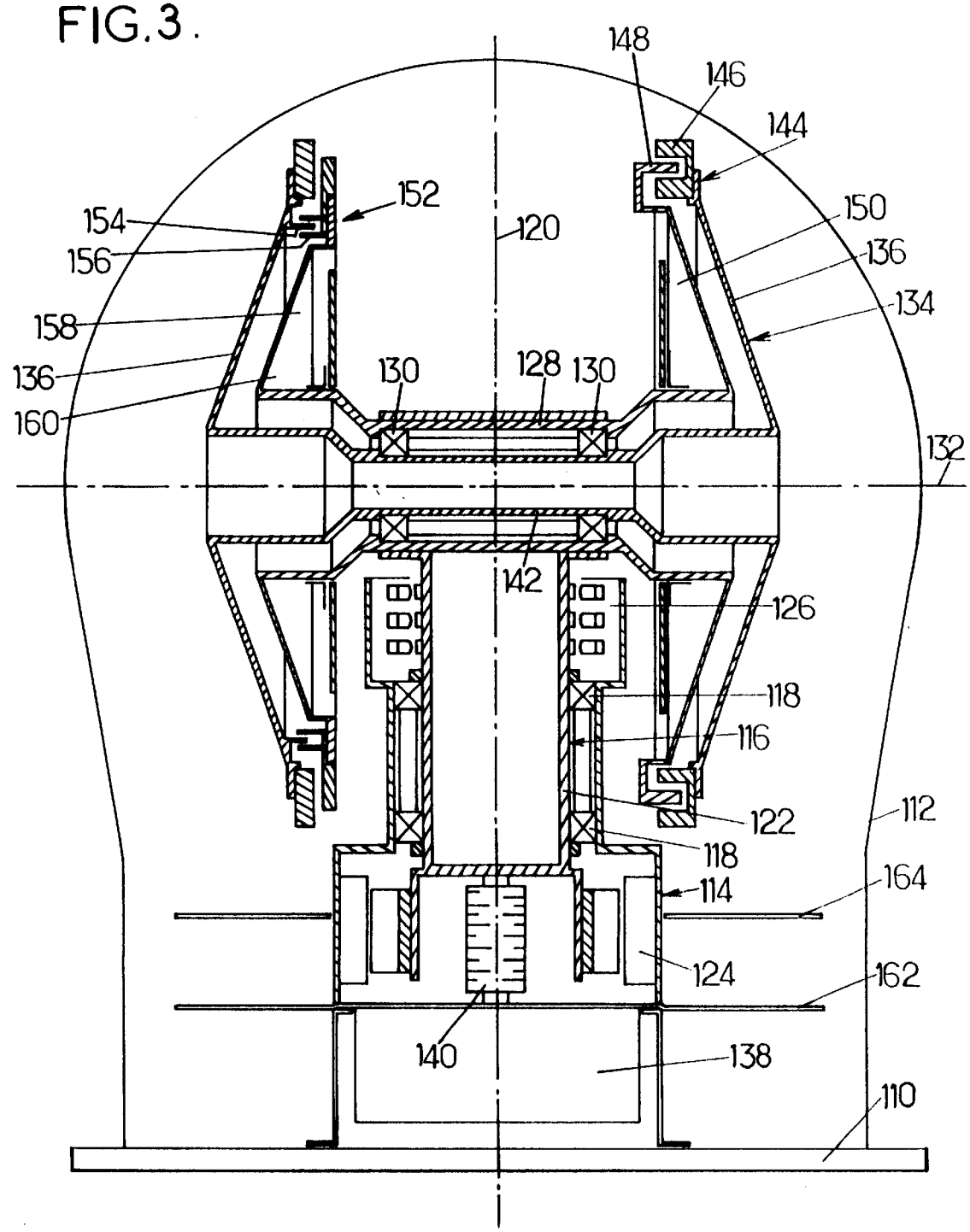
FIG. 3 shows a CMG suitable for use in apparatus of the invention.

FIG. 1 shows a cluster of four identical control moment gyros (CMGs) 10a, 10b, 10c, and 10d, each having a wheel 12 mounted in a gimbal 14 so as to be capable of rotating about an axis 16. A motor (not shown) keeps the wheel rotating, generally at constant speed. Each gimbal is mounted on the platform of the satellite (not shown) so as to be capable itself of turning about an axis 18 orthogonal to the axis 16. The axes 18 have different orientations. In the example shown, they occupy the edges of a regular pyramid whose apex is referenced 20.

Each of the gimbals is fitted with a motor 22 (only one of which is shown) enabling it to be turned about its corresponding axis 18. An angle sensor 24 provides information concerning the orientation of the gimbal, and thus concerning the plane of the wheel 12.

The satellite is maintained in a reference attitude in an inertial frame of reference by an attitude control system that may be of any known type. It includes a member 26 for performing calculations and controlling the motor 22, which member receives reference orientations from a transceiver 28 in communication with the ground, and also receives signals 30 coming from sensors (not shown) such as star sensors, earth horizon sensors, etc. This member controls power circuits 32 powering the motors. This system generally has a time constant that is relatively long, lying in the range a few seconds to several tens of seconds.

The apparatus also includes additional control means 34 into which the end positions to be given to the gimbals of the CMGs are transferred so as to cause the satellite to perform a reorientation maneuver. As mentioned above, these end positions for all of the. CMGs are evaluated on the assumption that reconfirmation will have been completed before the attitude control system can intervene to cancel the difference between the real attitude and the reference attitude for the satellite in an inertial frame of reference.

The cluster is reconfigured by the wheel axes being reoriented almost instantaneously and independently, and not by tracking a predetermined continuous path, step by step.

The initial configuration is non-singular and the final configuration is calculated so that it too is non-singular. singular. Any intermediate configuration is so transient that any (highly improbable) loss of rank of the Jacobian passes virtually unnoticed by the attitude control system 26.

There is thus no need to over dimension the control capacity of the cluster in order to avoid singularities. The full capacity of the angular momentum of the cluster can be used to perform the maneuver. A fraction of the margin saved can be reserved for releasing time for settling transients and for refining pointing along inertial axes after the tilt has been completed.

The reduction in tilting peak speeds obtained by reducing the duration of the acceleration and deceleration stages can be seen in FIGS. 2A and 2B.

By adopting a high level of torque, the speed profile, copied by the angular momentum profile, is given a shape that is rectangular (solid lines in FIGS. 2A and 2B).

The maximum angular momentum capacity required by the cluster to give rise to the overall exchange of angular momentum can be as little as half that applicable to low torque as represented by chain-dotted lines. However, angular momentum capacity is an essential factor in dimensioning the cluster (mass, dimensions, and speed of rotation of the wheels), while the torque capacity of a CMG is limited only by the maximum speed of rotation of the gimbal motor.

Consequently, it is advantageous to look for an angular momentum profile that is rectangular or trapezoidal with a long constant period. Adjustments to the starting and finishing slopes ensure that the profile is continuous relative to initial and final conditions for specified angular speed.

In the extreme case of a profile that is rectangular, guidance of the cluster is greatly simplified, since it suffices to calculate a reference configuration σ for the cluster such that $H(\sigma)=I_{sat}\Omega_{sat}$ (where $\Omega_{sat}$ is angular velocity) instead of a continuous trajectory σ(t).

For this purpose, a position reference is applied in an open loop to each motor at the beginning of each maneuver. Position servo-control makes use of an angle encoder and it reorients the gimbal as quickly as possible; the only limit is the bandwidth for controlling the gimbal motors and their maximum speed.

The internal angular momentum is reoriented almost instantaneously compared with the response time of the attitude servo-control. If necessary, the attitude servo-control system can be taken out of action during cluster reconfiguration or the amount of torque that is required can be limited to a value that is much less than the capacity of the CMGs. For this purpose, it is possible to use saturation or filtering techniques. The gimbal motors can be of the stepper type. This eliminates any need for a position servo-control system, since a stepper motor is controlled directly in terms of position. Fine control of microdisturbances and of aiming error can then be provided not by small reorientations of the gimbal axes, but by accelerating or decelerating the inertial wheels, with the system then forming part of an unsteady bundle of reaction wheels.

Once the cluster has been reconfigured, the satellite is driven at the appropriate speed about the selected axis, ignoring uncertainties concerning inertias and alignments.

Since reconfiguration is not strictly instantaneous, an attitude error is created relative to the ideal reference profile. The attitude control system needs to eliminate this error.

Since the end configuration of the, gimbals is selected to be quite far from any singularity, the attitude control system can compensate for these errors without difficulty by means of a conventional local guidance relationship for the cluster. Even after several maneuvers, the excursions of the positions of the gimbals about the reference configuration remain small and the cluster can be returned to its canonical configuration during desaturation stages in a standby period.

Each of the CMGs can have the structure shown in FIG. 3. The CMG then comprises a base 110 which cooperates with a sealed cover 112 to define a volume in which the entire actuator is located. A tilt mechanism is fixed to the base, the mechanism having a stator portion 114 and a rotor portion constituting a gimbal 116. The stator portion 114 is constituted by a sleeve in which guide means are placed (e.g. a ball bearing), the guide means 118 being spaced apart from one another so as to give a precise orientation to a tilt axis 120 about which a tube 122 belonging to the gimbal belongs.

The stator and rotor portions also have components of an electronically switched torque motor 124 using permanent magnets on its rotor portion.

The passage of electricity between the rotor portion and the stator portion can be provided by rotary connectors 126 of the slip ring and brush type, with three such systems being shown in FIG. 3.

The angular position of the gimbal or rotor portion is given at all times by an encoder 138 having a portion that is rigidly fixed to the stator portion 114 and having a rotor that is connected to the tube 122 via an elastic coupling 140.

It is possible to use an encoder, In particular an optical encoder, having an incremental output in the form of signals in quadrature. These signals can be processed by proximity electronics capable of operating in a period-measuring mode for fine aiming, and a frequency-measuring mode while tilting at high speed.

The output signals from the encoder can be used in various regulation and measurement loops:
  a motor control loop for switching phases and for controlling phase currents as a function of the motor's instantaneous position; and
  measuring the orientation of the wheel and controlling the instantaneous speed of tilting for controlling the torque generated on the satellite.

A socket 128 is fixed to the end of the tube 116 and carries its own guide means 130 that define the axis of rotation 132 of a wheel 134. The wheel can be regarded as comprising two disks 136 interconnected by a hollow shaft 142 carried by the guide means 130.

This disposition makes it possible to select the diameter of the bearings 130 so as to achieve the best possible compromise between mechanical strength both during launch and after a long lifetime in orbit, an acceptable resistive viscous couple, and a natural frequency in bending for the shaft that lies outside the range of parasitic frequencies that might be applied. To avoid polluting the inside of the cover 112, the ball bearings can be provided with baffles to prevent escape of the oil placed locally therein.

The wheel is rotated at a speed which is high, and generally constant. In the example shown in the figure, the wheel drive motor comprises a torque motor 144 having no brushes and no iron, that is generally electronically switched, and that provides torque which compensates for energy losses due to friction. In general, it can comprise a passive annular rotor lying at the periphery of one of the disks 136, and a winding 148 powered via rotary connectors 126 and fixed on a rim 158 parallel to the disk and secured to the socket 128. The electronics 150 for controlling and regulating the speed of the motor 144 can be placed on one or more printed circuit cards inserted inside the rim 158 parallel to the disk which is provided with the motor, and which can be given a mushroom shape.

Speed of rotation is measured by a tachometer 152 having a ring 154 fixed to the other disk 136, and an active portion 156 belonging to a second rim 158, similar to the rim carrying the winding 148. The second rim can contain a card 160 for processing the signals delivered by the tachometer, and connected to the outside via one of the rotary connectors 126.

The tachometer 152 is advantageously a contactless tachometer. In particular, it is possible to use a tachometer having opto-electronic couplers. By way of example, each coupler has at least one light-emitting diode (LED) and at least one phototransistor carried by the rim, the LED and the transistor co-operating with the annular ring 154 which has alternating transparent zones and opaque zones for the beam passing between the LED and the phototransistor.

Means for powering the motors 144 from an external source of electricity (not shown) can be mounted on a card 162 placed around the base of the stator portion 114. The power supply means for the tilt motor 124 can be placed on another card 164. Connections with the outside (not shown) enable tilting to be controlled from an external circuit.

What is claimed is:

1. A method of controlling the attitude of a satellite, comprising the steps of:

(a) providing a duster of CMGs on a satellite, said CMGs having respective wheels each rotatably mounted on a gimbal and said gimbals being mounted on a satellite platform to rotate about gimbal axes having different fixed directions, (b) from starting conditions and desired end conditions regarding attitude of the satellite and angular speed of the satellite and from an imparted time duration, determining set orientations of the gimbals about the axes thereof which correspond to a new configuration of the cluster of CMGs that is remote from any singular configuration and is such that exchange of angular momentum between the cluster of CMGs and the satellite during said imparted time duration will give rise to an attitude maneuver resulting into the desired end conditions; and (c) simultaneously and independently controlling the orientation of said gimbals about the axes thereof to bring said gimbals into the set orientations by applying an angular position reference in open loop in a local servo-control of the orientations of all gimbals.

2. A method according to claim 1, wherein speed increase is caused to take place almost instantaneously as compared with a response time of a general attitude servo-control system of the satellite.

3. A method according to claim 1, wherein an action of a general attitude control system for the satellite is limited while the cluster is being reconfigured.

4. A method according to claim 3, wherein said action is limited by saturation or filtering of a control torque requested by the attitude control system.

5. A method according to claim 1, wherein the cluster is made up of single-axis CMGS.

6. A method according to claim 5, wherein the cluster being made up of at least four CMGs, step (c) comprises selecting a reference configuration from all possible said new configurations of the cluster so as to optimize a selection criterion selected among:

maximizing the square root for a determinant of (AA'), which amounts to maximizing margin relative to singularities, A' being the Jacobian matrix defined by the formula $\partial_{ij}=\partial H_i/\partial \sigma_j$ where i=1 to 3 and j=1 to 4;

minimizing the norm defined by a vector s of norms of the rows of matrix $A'(A.A)^{-1}$, whereby maximizing the three-axis torque controllability of said new configuration;

minimizing the infinite norm of σ, which corresponds to minimizing time required for reconfiguring the cluster; and minimizing norm 2 of σ, whereby obtaining minimum-energy reconfiguration.

7. A method according to claim 1, wherein step (b) includes taking account of a constraint consisting in limiting an orientation domain angle of each of said gimbals to a predetermined range.

8. Apparatus for steering attitude of a satellite, the apparatus comprising:

a cluster of at least three CMGs for three-axis steering and of at least two CMGs for two-axis steering, the CMGs having respective wheels mounted on gimbals that are mounted on a satellite platform for rotation about different orientation axes by respective gimbal motors;

means for determining, from starting and desired end conditions in terms of satellite attitude and angular velocity and from allowed time duration for attitude change, a new configuration of orientations of the gimbals in the cluster that is remote from any singular configuration and is such that exchange of angular momentum between the cluster of CMGs and the satellite within said allowed time duration will cause a desired attitude maneuver from said starting conditions to said end conditions to take place; and means for simultaneously and independently driving the gimbal motors in such a manner as to bring the orientation of each gimbal about the orientation axis thereof into a set orientation corresponding to the new configuration by applying an angular position reference in open loop in an on-board local angular position servo-control of all gimbals.

9. Apparatus according to claim 8, wherein the different directions occupy edges of a virtual regular pyramids.

10. Apparatus according to claim 8, wherein each of said CMGs has a base carried by the satellite platform, a stator fixed to the base and constituting said gimbal, a rotor portion mounted on said stator for rotation about the gimbal axis and a wheel having a pair of disks mutually connected by a shaft supported by said stator for rotation with respect to said rotor about a wheel axis transverse to said gimbal axis.

* * * * *